(No Model.) 2 Sheets—Sheet 1.
C. C. STUART.
Process of and Apparatus for Ornamenting Moldings.
No. 237,628. Patented Feb. 8, 1881.
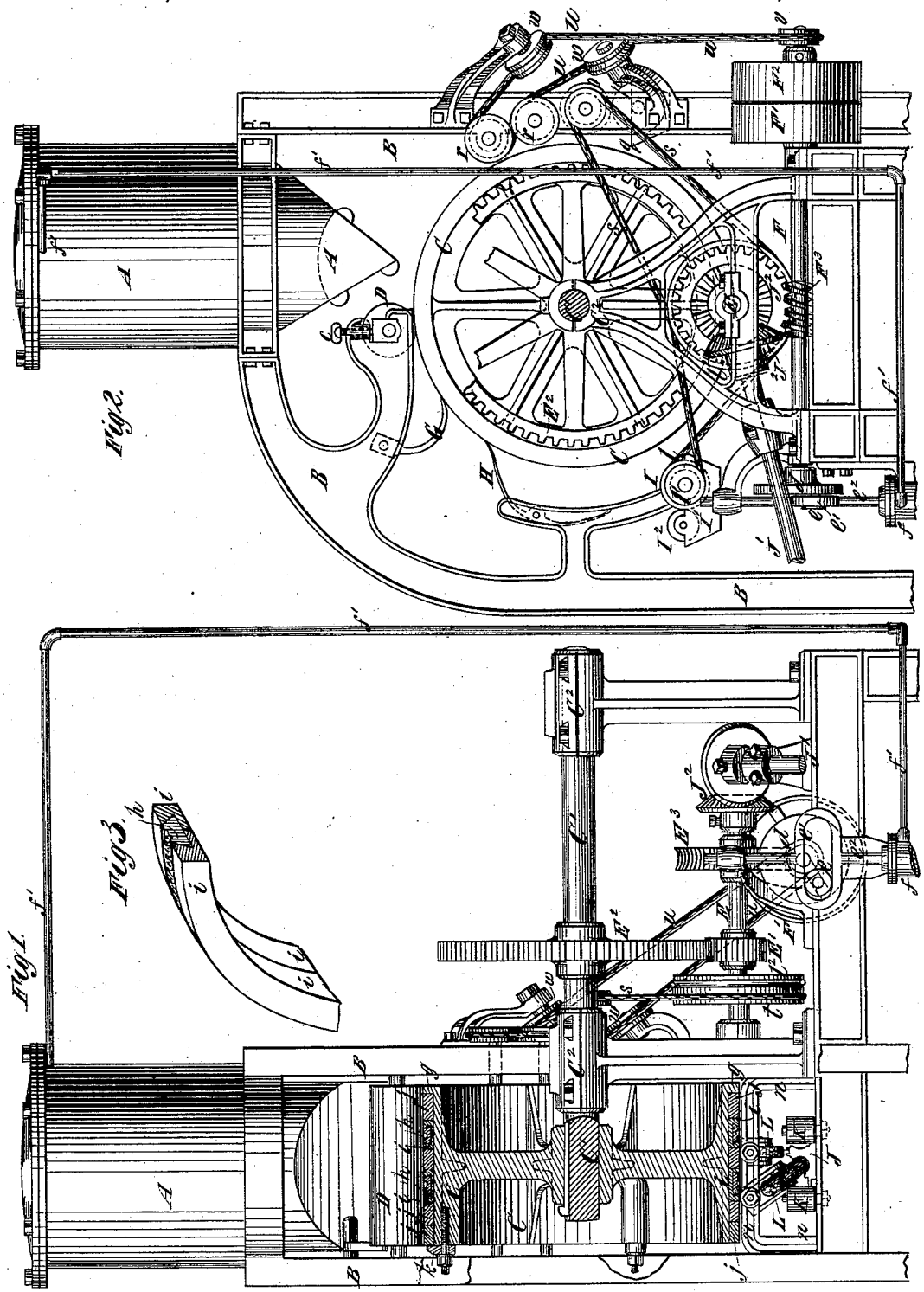

(No Model.) 2 Sheets—Sheet 2.
C. C. STUART.
Process of and Apparatus for Ornamenting Moldings.
No. 237,628. Patented Feb. 8, 1881.
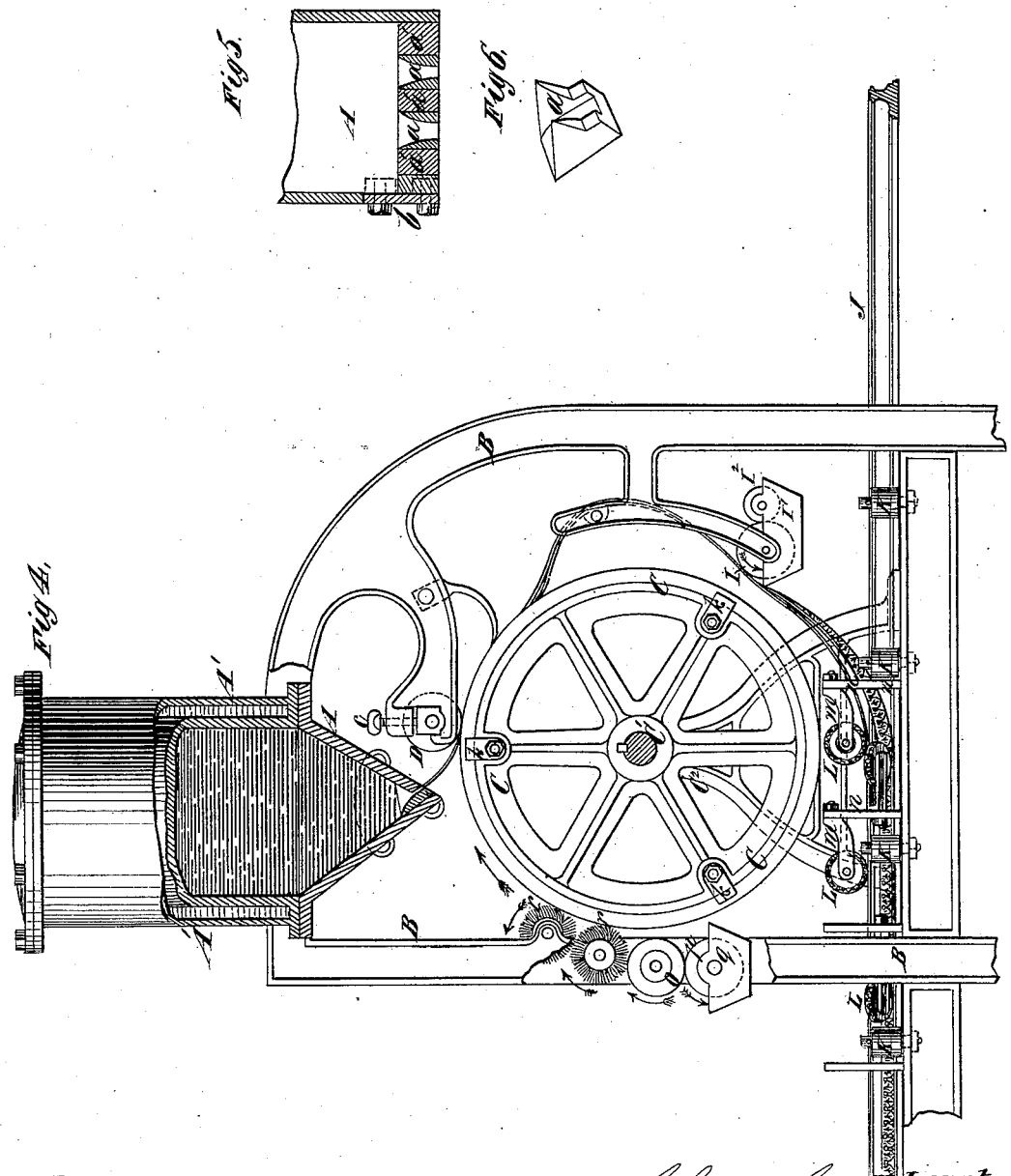

UNITED STATES PATENT OFFICE.

CHARLES C. STUART, OF NEW YORK, N. Y., ASSIGNOR OF ONE-HALF TO FRANK T. PEMBER, OF SAME PLACE.

PROCESS OF AND APPARATUS FOR ORNAMENTING MOLDINGS.

SPECIFICATION forming part of Letters Patent No. 237,628, dated February 8, 1881.

Application filed July 20, 1880. (No model.)

*To all whom it may concern:*

Be it known that I, CHARLES C. STUART, of the city of New York, in the county and State of New York, have invented certain new and useful Improvements in the Process of and Apparatus for Ornamenting Moldings, of which the following is a specification.

My invention relates to the manufacture of composition ornaments and applying them to moldings which have been previously prepared by coating them with composition, and which are to be afterward gilded and used to make picture-frames or for other purposes.

In making and applying these ornaments heretofore the plastic composition called "compo" has been rolled out by hand into a strip of comparatively short length, and then first pressed into a mold by the fingers and thumbs of the workman, and afterward pressed in a press, after which the surplus projecting above the mold is scraped off, the back of the molded strip or ribbon is covered with adhesive substance, and pressed upon the molding, previously prepared with composition to insure its adhesion thereto.

The object of my invention is to manufacture these composition ornaments by machinery in continuous strips or ribbons and apply them to the prepared moldings, all at one operation.

To this end my invention consists in a novel process of making composition ornaments and applying them to moldings—namely, in forming the composition in an endless strip or ribbon, in rolling a pattern thereon, in applying adhesive substance to the back of said strip or ribbon, and in subjecting the molding and the strip or ribbon applied thereto to rolling pressure to insure their adhesion.

The invention also consists in the combination, in a machine for making composition ornaments and applying them to moldings, of a hopper from which the composition is ejected in the form of a strip or ribbon, a pattern-cylinder and a pressure-roller revolving in contact therewith, whereby the pattern is imparted to the strip or ribbon, a roller or rollers for applying adhesive substance to the strip or ribbon, and pressure-rollers whereby the strip or ribbon is pressed tightly upon a molding to insure adhesion between the two.

The invention also consists in a novel construction and arrangement of an outlet or mouth for the hopper, whereby the composition is ejected therefrom in a thin broad strip or ribbon, a bead, or in any other form that may be desirable.

The invention also consists in making the hopper in the form of a closed cylinder, and in compressing air therein by means of an air-pump worked by the machine itself, whereby the ejection of the composition from the hopper is always commensurate with the speed at which the machine is working. Steam-pressure, a screw, or other means might, however, be employed for ejecting the composition from the hopper in lieu of the air-pressure.

The invention also consists in certain novel features in the construction of the pattern-cylinder, by which the pattern is rolled upon the strip or ribbon of composition; in a novel combination, with said cylinder, of means for oiling the pattern to prevent the strip or ribbon from adhering thereto; and in various novel details of construction and combinations of parts, whereby an effective and convenient machine is produced.

In the accompanying drawings, Figure 1 represents an end elevation of a machine embodying my improvements, partly in section. Fig. 2 represents a side elevation thereof. Fig. 3 represents a detail view of the molds for the pattern-cylinder. Fig. 4 represents an elevation of the side opposite to Fig. 2. Fig. 5 represents a sectional view of the lower portion of the hopper, showing clearly the adjustable mouth or outlet therefor; and Fig. 6 represents a perspective view of one of the pieces forming said mouth or outlet.

Similar letters of reference designate corresponding parts in all the figures.

The composition which I employ is the kind which is ordinarily used for making ornaments to be applied to moldings, and is composed preferably of glue, rosin, linseed-oil, and gilders' whiting in suitable proportions.

A designates a hopper, the upper part of which consists, preferably, of a closed cylindric portion surrounded by a jacket, A', for the circulation of steam or other heating agent, for retaining the composition in such a plastic condition that it may be readily worked. This hopper is supported upon a frame-work, B, (clearly shown in Fig. 2.) The hopper A is constructed with an adjustable mouth or throat composed of recessed or channeled removable blocks $a$, (shown clearly in Figs. 5 and 6,) which are slipped transversely in from one side of the hopper, which is afterward closed by a removable plate or cover, $b$, as shown clearly in Fig. 4. The blocks, in which are openings of the size and shape of the transverse section of the strip or ribbon to be produced, are separated by filling-blocks $a'$, placed between them, and by this means the mouth or throat of the hopper may be arranged to produce one, two, or more strips or ribbons of any desired size and shape, and at any distance apart.

The plastic composition, which is the same as that ordinarily used for making such ornaments, is placed in the hopper A and kept at a proper consistency by steam or other heating agent introduced into the jacket A'. If pressure be now applied within the hopper, the composition will be ejected through the mouth or throat in the form of one, two, or more continuous strips or ribbons. This pressure is applied in a manner hereinafter explained. The strips or ribbons, as they issue from the mouth or throat of the hopper, pass between what I term a "pattern-cylinder," C, and a top or pressure roller, D, arranged with its axis parallel with the axis of the pattern-cylinder, and in bearings which, by means of set-screws $c$, may be set down to cause the said roller to press tightly against the pattern-cylinder and be driven or rotated through frictional contact with said pattern-cylinder. The top roll, D, being pressed tightly against the pattern-cylinder, keeps back any surplus composition which may be passed through the throat or mouth of the hopper A, the mold from which the pattern is imparted to the strip or ribbon being sunk below the face of the cylinder; but by properly adjusting the area of the mouth or throat of the hopper and the pressure whereby the composition is ejected, in a manner hereinafter described, very little, if any, composition over what is required to fill the mold in the pattern-cylinder will be passed through the mouth or throat of the hopper.

The pattern-cylinder C is fixed to rotate with a shaft, C', in suitable bearings, $C^2$, and such shaft receives its rotary motion from a counter-shaft, E, through a spur-pinion and spur-wheel, $E'$ $E^2$, as shown in Fig. 1.

F designates the driving-shaft of the machine, which derives motion from a belt upon fast and loose pulleys $F'$ $F^2$, and which imparts its motion through a worm or screw, $F^3$, and a worm-wheel, $E^3$, to the counter-shaft E.

Mounted upon the end of the driving-shaft F is a disk-crank, $d$, the crank-pin of which carries a roller, $e$, which engages with a yoke, $e'$, attached to the piston-rod $e^2$ of an air-pump, $f$, from which air is discharged through a pipe, $f'$, to the composition-hopper A, compressing the air therein to effect the ejection of composition from the mouth or throat of said hopper. Steam-pressure or a screw or propeller might be employed in lieu of air-pressure for this purpose; but the air-pump is very desirable, inasmuch as if the machine is driven at a rapid speed the air-pump is driven faster and the composition issues from the mouth or throat of the hopper with greater velocity, the velocity at which the strip or ribbon issues from the hopper being automatically regulated by the speed of the machine itself. When large openings or outlets are provided in the mouth or throat of the hopper, a larger quantity of air must be supplied to the hopper to eject the composition at a uniform velocity, and to provide for this the crank-pin for operating the pump piston-rod $e^2$ is arranged in a radial slot in the crank $d$, and may be shifted nearer to or farther from the center of the shaft F, in order to diminish or increase the throw of the crank and the amount of air discharged by the air-pump.

I will now describe the construction of the pattern-cylinder C. This cylinder is made in the form of a flat-faced cast-iron drum provided at one edge with a flange, $g$, projecting slightly beyond the face, as shown clearly in Fig. 1. The pattern-molds $h$, which are shown clearly in detail upon a larger scale in Fig. 3, are composed of rings built up of segmental sections joined end to end, and they may be made of wood or of electrotypes backed with type-metal, and have the pattern of the desired ornamentation sunk or recessed in their exterior faces. The number of molds to be used should correspond in any case to the number of outlets in the mouth or throat of the hopper, in this case two being represented. The sections of the pattern-molds are dovetailed upon opposite sides, as shown clearly in Fig. 3, and are held in divided mold-holding rings $i$, correspondingly dovetailed, so as to prevent outward displacement of the pattern-molds. The surface of the pattern-cylinder C is covered with the mold-holding rings $i$ and filling-rings $j$, interposed between said mold-holding rings, to hold them at proper distances apart, and all are held in place by being clamped against the back flange, $g$, by buttons or clamps $k$, bolted to the side of the cylinder, as shown in Figs. 1 and 4. By loosening the bolts by which the buttons or clamps are held in place the said clamps may be turned aside and any of the rings $i$ or $j$ changed in position or removed, to adapt the machine for operating upon a different form of molding. By the top roller, D, the strip or ribbon of composition, as it passes between it and the pattern-cylinder, is embedded or pressed into all the interstices of the mold and the ornamentation of the desired pattern imparted to it.

G designates a knife or scraper bearing upon the face of the pattern-cylinder, and serving to scrape off any film or rough edges that may project from the composition strip or ribbon beyond the surface of the cylinder. The one or more strips or ribbons, after passing under the knife G, are conducted over a curved guard or guide, H, which is long enough to afford adequate support to the said strips or ribbons, and the latter, after leaving said guide, pass over a sizing or paste wheel, I, revolved positively in a paste-box, I', by means of a belt, l, passing over a pulley, l', upon the shaft of said wheel, and a pulley, l², upon the counter-shaft E.

In connection with the sizing-wheel I, I employ a regulating-wheel, I², which rotates in contact therewith and prevents too large a quantity of sizing or adhesive substance being applied to the strips or ribbons.

The molding J, to which the ornamented and sized strips or ribbons are to be applied, the one to the side and the other to the top thereof, and which are first prepared by coating or covering them with composition in a well-known manner, are fed through the machine in lengths following one another, each length being pushed forward by the one in rear of it, and the moldings are properly guided by guide-pulleys K at each side thereof, fitted upon vertical axes.

Any desired mechanism may be employed for producing the feeding of the moldings; but the one which I prefer to employ is that forming the subject of the application for Letters Patent of the United States filed by me June 22, 1880.

J' designates a shaft, which derives motion from the counter-shaft E by means of bevel-gears J², and by which the mechanism for feeding the rollers may be driven.

The composition strips or ribbons, being continuously applied to the lengths of moldings, the one upon the top and the other upon the side, travel forward with them and pass under felt-covered rollers L, a number of which are employed, as shown in Fig. 4, and by these rollers the ornamented strips are caused to adhere tightly to the molding. As the lengths of molding pass from the machine the composition strips or ribbons are severed by a knife at the end of each length and the moldings conveyed away to be dried. The felt-covered rollers L are pivoted in holders m, so that they are free to revolve by friction; and to provide for their adjustment, so as to bear upon the molding at various angles, these holders are clamped in bridge-pieces n, arranged transversely to the line of travel of the molding, which are slotted, as shown clearly in Fig. 1, so as to permit of the adjustment of the holders m to set the rollers at any desired angle.

In order to prevent the strips or ribbons from sticking in the mold in the pattern-cylinder, I oil the said mold, and the means here shown for effecting this consists of a roller, o, having a positive motion imparted to it from a feed-roller, p, rotated in an oil-box, q, by means of frictional contact with the roller o.

I also employ two rotary brushes, r, which take the oil from the roller o and distribute it upon the mold in the pattern-cylinder C. The roller o derives a slow motion, by means of a belt, s, from a pulley, t, upon the counter-shaft E, while the brushes r derive their motion, through a belt, u, from a pulley, v, upon the driving-shaft F, the said belt passing over suitable guide-pulleys, w, as represented in Fig. 2.

By my invention I provide a machine by which moldings of a kind formerly ornamented only by hand may be ornamented much more cheaply than has heretofore been possible.

What I claim as my invention, and desire to secure by Letters Patent, is—

1. The process of making composition ornaments and applying them to moldings, consisting in forming the composition into a continuous strip or ribbon, in rolling a pattern thereon, in applying adhesive substance to the back of said strip or ribbon, and in subjecting the molding and the strip or ribbon applied thereto to rolling pressure to insure their adhesion, substantially as specified.

2. The combination, in a machine for making composition ornaments and applying them to moldings, of a hopper from which the composition is ejected in the form of a strip or ribbon, a pattern-cylinder and a roller working in contact therewith, whereby the pattern is imparted to the strip or ribbon, a roller or rollers for applying adhesive substance to said strip or ribbon, and pressure-rollers whereby the strip or ribbon is pressed tightly on the molding to insure adhesion between the two, substantially as specified.

3. The combination, in a machine for making composition ornaments and applying them to moldings, of a hopper having a closed upper portion, a pattern-cylinder and a pressure-roller revolving in frictional contact with said cylinder, a sizing roller or rollers for sizing the strip or ribbon, pressure-rollers for pressing the strip or ribbon tightly upon the molding, and an air-pump operated by the machine for compressing air in said closed hopper, substantially as specified.

4. The combination, in a machine for making composition ornaments and applying them to moldings, of a hopper having a closed upper portion, a pattern-cylinder and a pressure-roller revolving in contact with said cylinder, a sizing roller or rollers, pressure-rollers for pressing the strip or ribbon upon the molding, an air-pump worked by the machine for compressing air in said closed hopper, and means for adjusting the stroke of said pump, substantially as specified.

5. The combination, with the hopper A, of the recessed or channeled removable blocks a and the filling-blocks a', inserted in the mouth or throat of the hopper from one side thereof, and the removable cover b, substantially as specified.

6. The pattern-cylinder composed of a drum or wheel having a broad flat face and a flange, g, projecting beyond the face at one edge thereof, segmental sectional molds, mold-holding rings receiving said molds, filling-rings, and means for clamping said mold-holding rings and filling-rings side by side upon the drum or wheel against said flange, substantially as specified.

7. The pattern-cylinder C, composed of a drum or wheel having a broad flat face and a flange, g, projecting beyond the face at one edge thereof, molds h, composed of dovetailed sections, the divided mold-holding rings i, correspondingly dovetailed, the filling-rings j, and clamps or buttons k, substantially as specified.

8. The combination, in a machine for applying ornamented composition strips or ribbons to moldings, of guide-rollers K for the molding, pressure-rollers L, roller-holders m, and the slotted bridges n, arranged transversely to the line of travel of the molding, substantially as specified.

CHAS. C. STUART.

Witnesses:
FREDK. HAYNES,
FRED THORNHILL.